United States Patent
Iwamoto et al.

(10) Patent No.: US 10,267,967 B2
(45) Date of Patent: Apr. 23, 2019

(54) OPTICAL COMPONENT FOR THE POLARIZATION OF INFRARED LASER LIGHT

(71) Applicants: Sumitomo Electric Industries, Ltd., Osaka-shi (JP); SUMITOMO ELECTRIC HARDMETAL CORP., Itami-shi (JP)

(72) Inventors: Hiromi Iwamoto, Osaka (JP); Kunimitsu Yajima, Itami (JP)

(73) Assignees: Sumitomo Electric Industries, Ltd., Osaka-shi (JP); Sumitomo Electric Hardmetal Corp., Itami-shi (JP)

( * ) Notice: Subject to any disclaimer, the term of this patent is extended or adjusted under 35 U.S.C. 154(b) by 92 days.

(21) Appl. No.: 15/303,311

(22) PCT Filed: Apr. 17, 2015

(86) PCT No.: PCT/JP2015/061850
§ 371 (c)(1),
(2) Date: Oct. 11, 2016

(87) PCT Pub. No.: WO2015/166822
PCT Pub. Date: Nov. 5, 2015

(65) Prior Publication Data
US 2017/0038509 A1    Feb. 9, 2017

(30) Foreign Application Priority Data
May 1, 2014    (JP) .................................. 2014-094727

(51) Int. Cl.
*G02B 5/30*    (2006.01)
*G02B 1/11*    (2015.01)
(Continued)

(52) U.S. Cl.
CPC .............. *G02B 5/3041* (2013.01); *G02B 1/11* (2013.01); *G02B 1/115* (2013.01); *G02B 5/30* (2013.01); *G02B 5/3066* (2013.01); *G02B 27/28* (2013.01)

(58) Field of Classification Search
CPC ...... G02B 5/30; G02B 5/3025; G02B 5/3033; G02B 5/3041; G02B 5/3066; G02B 1/11;
(Continued)

(56) References Cited

U.S. PATENT DOCUMENTS 3,914,018 A * 10/1975 DeShazer ................ G02B 1/08
359/489.09
4,733,926 A * 3/1988 Title ..................... G02B 27/283
359/352
(Continued)

FOREIGN PATENT DOCUMENTS

JP    02-288383 A    11/1990
JP    03-226701 A    10/1991
(Continued)

OTHER PUBLICATIONS

"Infrared Polarizers—Theory and Applications" [retrieved on Sep. 2, 2013] Retrieved from the Internet: <URL: http://www.systems-eng.co.jp/dcms_media/image/polarizers.pdf>.
(Continued)

*Primary Examiner* — Stephone B Allen
*Assistant Examiner* — Adam W Booher
(74) *Attorney, Agent, or Firm* — Baker Botts L.L.P.; Michael A. Sartori

(57) ABSTRACT

Provided is an optical component including: a pair of substrate bodies each having a refractive index of not lower than 2 with respect to infrared laser light, and having an incident surface or an emitting surface and an inclined surface inclined with respect to this surface at θi; and an
(Continued)

antireflective film which prevents reflection of normal incident infrared laser light, wherein $\theta i$ is not smaller than a complementary angle $\theta tB$ of a Brewster's angle $\theta B$ of infrared laser light incident on a plate member and smaller than a critical angle $\theta c$, the inclined surfaces are opposed to each other via a gap, and the incident surface and the emitting surface are arranged in parallel to each other.

6 Claims, 12 Drawing Sheets

(51) Int. Cl.
    *G02B 1/115*     (2015.01)
    *G02B 27/28*     (2006.01)

(58) Field of Classification Search
    CPC ........ G02B 1/113; G02B 1/115; G02B 27/28; G02B 27/283; G02B 27/285; G02B 27/286; H01S 3/0071; H01S 3/0085; H01S 3/10; H01S 3/10061
    See application file for complete search history.

(56) References Cited

U.S. PATENT DOCUMENTS

| | | | |
|---|---|---|---|
| 5,128,953 A * | 7/1992 | Macken | H01S 3/0401 |
| | | | 372/34 |
| 5,339,441 A | 8/1994 | Kardos et al. | |
| 2007/0103606 A1* | 5/2007 | Hashizume | G02B 7/008 |
| | | | 349/5 |

FOREIGN PATENT DOCUMENTS

| | | |
|---|---|---|
| JP | 05-323117 A | 12/1993 |
| JP | 05-323118 A | 12/1993 |
| JP | 2004-077831 A | 3/2004 |
| JP | 2014-026148 A | 2/2014 |

OTHER PUBLICATIONS

"Thin Film Polarizers" [retrieved on Sep. 2, 2013] Retrieved from the Internet: <URL: http://www.iiviinfrared.com/CO2-Lasers-Optics/thin-film-poloarizers.html>.

H.A. Macleod, "Thin-Film Optical Filters," Second Edition, Macmillan Publishing Company, New York, 1986.

International Search Report in International Application No. PCT/JP2015/061850, dated Jun. 23, 2015.

* cited by examiner

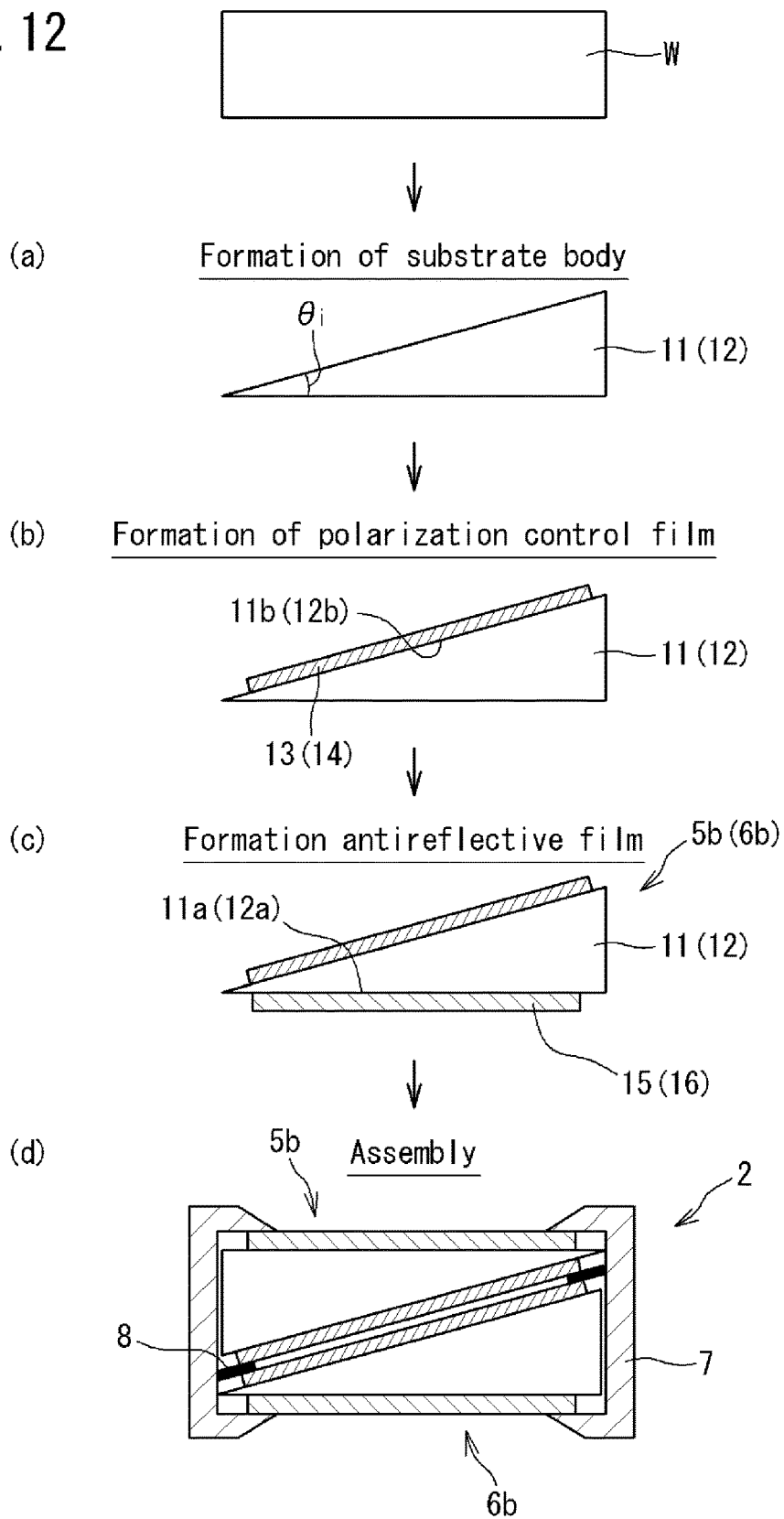

OPTICAL COMPONENT FOR THE POLARIZATION OF INFRARED LASER LIGHT

TECHNICAL FIELD

The present invention relates to an optical component.

BACKGROUND ART

Laser processing with the use of infrared laser light (hereinafter referred to as "infrared laser processing") has been used for processing of a workpiece such as a metallic member, for example, micro-drilling, cutting and welding.

Infrared laser light emitted from a laser resonator used for the infrared laser processing, such as carbon dioxide laser light having a wavelength of 9.3 to 10.6 μm, can have polarization planes in a variety of directions such as a horizontal direction, a vertical direction and a direction inclined with respect to a horizontal plane by 45°. In addition, the infrared laser light can have a polarization plane shifted from a desired polarization plane. Accordingly, a polarizer has been used for a correction for shift of the polarization plane, an adjustment for intensity of the infrared laser light and a stabilization of an oscillation state of the infrared laser light.

As the polarizer, for example, there is known a wire grid polarizer in which metallic wires are arranged on the surface of a substrate made of a substrate material through which desired light transmits (for example, see Patent Literature 1). However, the wire grid polarizer is difficult to apply to infrared laser light having an intensity exceeding 10 W/cm$^2$ (for example, continuous wave carbon dioxide laser light).

Meanwhile, as a polarizer having more excellent power resistance than the wire grid polarizer, there is known a plate polarizer in which a coated plate made of zinc selenide or germanium is arranged so as to be oriented in a direction of a Brewster's angle with respect to an incident beam, and an optical multilayer film is formed (for example, thin-film polarizer (abbreviated name: TFP) manufactured by II-VI Incorporated).

CITATION LIST

Patent Literature

Patent Literature 1: Japanese Unexamined Patent Publication No. 2004-77831

SUMMARY OF INVENTION

Technical Problem

However, since the plate polarizer formed with the optical multilayer film requires an incident angle being a large Brewster's angle, it requires a large space length along a travelling direction of infrared laser light when the polarizer is used for a device such as the laser processing machine. In this case, since unnecessary reflected light is required to be dumped, the plate polarizer formed with the optical multilayer film has a drawback of causing an increase in size of the device.

In view of such a conventional problem, an object of the present invention is to provide an optical component capable of obtaining infrared laser light having a polarization plane in a desired direction in a small space.

Solution to Problem

One aspect of the present invention includes:

(1) an optical component for transmitting infrared laser light therethrough, to give infrared laser light having a polarization plane in a desired direction, the optical component including:

a first substrate body which is made of a plate member through which the infrared laser light transmits, the plate member having a refractive index of not lower than 2 with respect to the infrared laser light, the first substrate body having an incident surface on which the infrared laser light is incident, and an inclined surface inclined with respect to the incident surface at a predetermined inclined angle θi;

a second substrate body which is made of the plate member, and has an emitting surface which emits the infrared laser light, and an inclined surface inclined with respect to the emitting surface at the predetermined inclined angle θi; and an antireflective film which is formed on each of the incident surface and the emitting surface and prevents reflection of normal incident infrared laser light, wherein the first and second substrate bodies are arranged such that the inclined surface of the first substrate body and the inclined surface of the second substrate body are opposed to each other via a gap, and that the incident surface and the emitting surface are parallel to each other, the inclined angle θi is not smaller than a complementary angle θtB of a Brewster's angle θB of infrared laser light incident on the plate material and smaller than a critical angle θc, and the complementary angle θtB of the Brewster's angle θB is an angle calculated by the formula (I):

$$\theta tB = 90° - \theta B \quad (I)$$

wherein θB represents a Brewster's angle represented by the formula (II):

$$\theta B = \arctan(n(\lambda)) \quad (II)$$

wherein n(λ) represents a refractive index of the plate member with respect to infrared laser light with a wavelength λ, and the critical angle θc is an angle calculated by the formula (III):

$$\theta c = \arcsin(1/n(\lambda)) \quad (III)$$

wherein n(λ) is the same as above.

Advantageous Effects of Invention

According to the optical component of the present invention, there can be obtained infrared laser light having a polarization plane in a desired direction in a small space.

BRIEF DESCRIPTION OF DRAWINGS

FIG. 12 is a process diagram of a manufacturing method for the optical component according to the second embodiment of the present invention.

DESCRIPTION OF EMBODIMENTS

Figure 1:
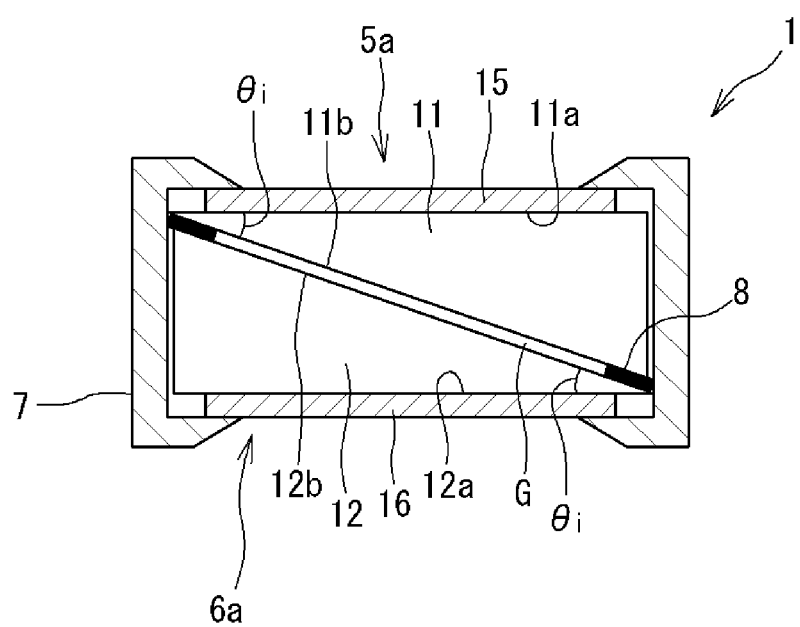
FIG. 1 is a sectional explanatory view showing an optical component according to one embodiment (first embodiment) of the present invention.

[Description of Embodiments of the Present Invention]

First, embodiments of the present invention will be enumerated and described.

The embodiment of the present invention includes:

(1) an optical component for transmitting infrared laser light therethrough, to give infrared laser light having a polarization plane in a desired direction, the optical component including:

a first substrate body which is made of a plate member through which the infrared laser light transmits, the plate member having a refractive index of not lower than 2 with respect to the infrared laser light, the first substrate body having an incident surface on which the infrared laser light is incident, and an inclined surface inclined with respect to the incident surface at a predetermined inclined angle $\theta i$;

a second substrate body which is made of the plate material, and has an emitting surface which emits the infrared laser light, and an inclined surface inclined with respect to the emitting surface at the predetermined inclined angle $\theta i$; and an antireflective film which is formed on each of the incident surface and the emitting surface and prevents reflection of normal incident infrared laser light, wherein the inclined angle $\theta i$ is not smaller than a complementary angle $\theta tB$ of a Brewster's angle $\theta B$ of infrared laser light incident on the plate material and smaller than a critical angle $\theta c$, the complementary angle $\theta tB$ of the Brewster's angle $\theta B$ is an angle calculated by the formula (I):

$$\theta tB = 90° - \theta B \qquad (I)$$

wherein $\theta B$ represents a Brewster's angle represented by the formula (II):

$$\theta B = \arctan(n(\lambda)) \qquad (II)$$

wherein $n(\lambda)$ represents a refractive index of the plate member with respect to infrared laser light with a wavelength $\lambda$, the critical angle $\theta c$ is an angle calculated by the formula (III):

$$\theta c = \arcsin(1/n(\lambda)) \qquad (III)$$

wherein $n(\lambda)$ is the same as above, and the first and second substrate bodies are arranged such that the inclined surface of the first substrate body and the inclined surface of the second substrate body are opposed to each other via a gap, and that the incident surface and the emitting surface are parallel to each other.

In the optical component adopted with the above configuration, the first and second substrate bodies are arranged such that the inclined surface of the first substrate body and the inclined surface of the second substrate body are opposed to each other via a gap, and that the incident surface and the emitting surface are parallel to each other, and the inclined angle $\theta i$ of the inclined surface of each of the first and second substrate bodies is not smaller than the complementary angle $\theta tB$ of the Brewster's angle $\theta B$ of the infrared laser light incident on the plate member and smaller than the critical angle $\theta c$. Therefore, out of the infrared laser light incident on the optical component, a desired polarization component can be well transmitted. Polarized light which is not transmitted through the optical component (non-transmitted light) is repeatedly reflected inside the first substrate body on the incident side, and is thereby confined inside the first substrate body. Further, a small amount of non-transmitted light which is emitted from the first substrate body and incident on the second substrate body is repeatedly reflected in the gap between the first and second substrate bodies, to be confined in the gap. Therefore, in either case, the confined non-transmitted light can be absorbed and eliminated at the peripheral edges of the first and second substrate bodies. Since the non-transmitted light is removed in the small space by the optical component by being reflected and absorbed in the component, according to the optical component, there can be selectively obtained infrared laser light having a polarization plane in a desired direction.

(2) It is preferable that the optical component further include a polarization control film for transmitting a desired polarization component of the infrared laser light therethrough, and suppressing incidence of an unnecessary polarization component of the infrared laser light, the polarization control film being formed on the inclined surface of each of the first substrate body and the second substrate body.

According to the optical component adopted with the above configuration, a polarization component in a non-desired direction can be reflected by means of the polarization control film, so as to effectively suppress emission of a non-desired polarization component to the outside of the optical component.

(3) It is preferable that the polarization control film is a multilayer film having a multilayer structure in which two or more kinds of layers each having different refractive indexes are alternately laminated. An upper limit of the number of layers can be appropriately decided in accordance with an application the optical component.

(4) Further, it is preferable that the polarization control film is a multilayer film having a multilayer structure in which a first refractive index layer and a second refractive index layer are alternately laminated, the first refractive index layer having a first refractive index, and a second refractive index layer having a second refractive index which is lower than the first refractive index.

According to the optical component adopted with the above configuration, it is possible to perform polarization control by means of a thin polarization control film. Thus, according to such an optical component, there can be obtained the infrared laser light having the polarization plane in the desired direction in a smaller space. Therefore, according to the optical component adopted with the above configuration, a device such as a laser processing machine can be downsized.

(5) It is preferable that the optical component further include a holder for keeping such that the inclined surface of the first substrate body and the inclined surface of the second substrate body are opposed to each other via a gap, and that the incident surface and the emitting surface are parallel to each other. In this case, it is preferable that the holder have a cooling unit for cooling the first and second substrate bodies.

According to the optical component adopted with the above configuration, there can be promptly cooled the optical component which generates heat due to transmission of the infrared laser light having the polarization component in the desired direction and due to reflection and absorption of the infrared laser light having the polarization component in the non-desired direction in the optical component. Therefore, the optical component adopted with the above configuration can suppress deterioration associated with generation of heat, and can thus be expected to have a long life.

(6) It is preferable that a spacer made of a thermal conduction material for keeping the gap be provided at a peripheral edge of the inclined surface of each of the first and second substrate bodies.

In the optical component adopted with the above configuration, heat can be diffused to the outside via the spacer, the heat being generated in the optical component in association with transmission of the infrared laser light having the polarization component in the desired direction and in association with reflection of the infrared laser light having the polarization component in the non-desired direction in the optical component. This allows prompt cooling of the optical component. Therefore, since the optical component adopted with the above configuration can suppress deterioration associated with generation of heat, the optical component can thus be expected to have a long life.

[Optical Component According to First Embodiment]

Hereinafter, embodiments of the optical component of the present invention will be described in detail with reference to the attached drawings. In the following drawings, in order to facilitate description of a polarization control film, an antireflective film and a spacer which constitute the optical component, those are drawn with sizes thereof appropriately exaggerated.

FIG. 1 is a sectional explanatory view showing an optical component according to one embodiment (first embodiment) of the present invention.

An optical component 1 shown in FIG. 1 includes a pair of substrate elements 5a and 6a and a holder 7. In the optical component 1 as above, the substrate elements 5a and 6a are the same substrate elements. With the substrate elements 5a and 6a being the same as thus described, at the time of manufacturing the optical component 1, it is not necessary to separately manufacture different substrate elements. Therefore, the optical component 1 according to the first embodiment is excellent in industrial productivity.

The substrate element 5a is made up of a substrate body 11 and an antireflective film 15 which prevents reflection of normal incident infrared laser light. Further, the substrate element 6a is made up of a substrate body 12 and an antireflective film 16 which prevents reflection of normal incident infrared laser light.

In the present specification, for the sake of convenience, a substrate element arranged on the incident side of infrared laser light is taken as the substrate element 5a and a substrate element arranged on the emitting side of infrared laser light is taken as the substrate element 6a.

The substrate body 11 has an incident surface 11a on which infrared laser light is incident (target surface on which a beam is incident), and an inclined surface 11b inclined with respect to the incident surface 11a at a predetermined inclined angle $\theta i$. The substrate body 12 has an emitting surface 12a from which infrared laser light is emitted, and an inclined surface 12b inclined with respect to the emitting surface 12a at the predetermined inclined angle $\theta i$. The substrate bodies 11 and 12 are each made of a plate member which transmits infrared laser light and of which refractive index with respect to the infrared laser light is not lower than 2. The substrate bodies 11 and 12 each have a right-angled triangular cross sectional shape. In the first embodiment, the substrate bodies 11 and 12 are formed in a disk shape.

In the optical component 1 according to the first embodiment, zinc selenide is used as a material constituting the plate member.

In the present invention, the material constituting the plate material can be a material which transmits infrared laser light and of which refractive index with respect to the infrared laser light is not lower than 2. The material constituting the plate member includes, for example, zinc sulfide, germanium, gallium arsenide, and the like, in addition to zinc selenide described above, but the present invention is not limited only to such examples. Since an absorption coefficient in a high-output infrared laser wavelength is required to be extremely small, among the above materials, zinc selenide and germanium are preferable, and polycrystal zinc selenide which is synthesized by chemical vapor deposition (CVD) is more preferable, in the present invention. The refractive index of the plate member with respect to the infrared laser light can be not lower than 2. The refractive index of the plate member with respect to the infrared laser light is preferably not higher than 5.

The substrate bodies 11 and 12 are arranged such that the inclined surface 11b of the substrate body 11 and the inclined surface 12b of the second substrate body 12 are opposed to each other via a gap, and that the incident surface and the emitting surface are parallel to each other.

Further, in the substrate bodies 11 and 12, the inclined angle $\theta i$ of each of the inclined surfaces 11b and 12b is not smaller than a complementary angle $\theta tB$ of a Brewster's angle $\theta B$ of the infrared laser light incident on each of the substrate bodies 11 and 12. The inclined angle $\theta i$ of each of the inclined surfaces 11b and 12b is smaller than a critical angle $\theta c$. The inclined angle $\theta i$ as thus described can be appropriately set within the above range in accordance with desired polarization characteristics or the like.

In such a manner, the substrate bodies 11 and 12 are arranged such that the inclined surface 11b of the substrate body 11 and the inclined surface 12b of the second substrate body 12 are opposed to each other via the gap, and that the incident surface and the emitting surface are parallel to each other. Furthermore, the inclined angle $\theta i$ of the inclined surface of each of the substrate bodies 11 and 12 is not smaller than the complementary angle θtB of the Brewster's angle θB of the infrared laser light incident on the plate member. The inclined angle θi of the inclined surface of each of the substrate bodies 11 and 12 is smaller than the critical angle θc. For this reason, for example when transmitted light in the optical component 1 is a "desired p-polarization component" and non-transmitted light in the optical component 1 is a "non-desired s-polarization component", most of the non-desired s-polarization component which is not transmitted through the optical component is repeatedly reflected inside the substrate body 11 on the incident side, to thereby be confined inside the substrate body 11. In addition, slight non-desired s-polarization component which is emitted from the first substrate body and incident on the second substrate body 12 is repeatedly reflected in a gap G between the first and second substrate bodies, to thereby be confined in the gap G. Hence the confined non-desired s-polarization component can be absorbed and eliminated at the peripheral edges of the first and second substrate bodies 11 and 12. Thus, by the optical component 1, the non-transmitted light is reflected and absorbed in the optical component 1, whereby the non-transmitted light is removed. Therefore, according to the optical component, infrared laser light having a polarization plane in a desired direction can be selectively obtained.

The complementary angle θtB of a Brewster's angle θB is an angle calculated by the formula (I):

$$\theta tB = 90° - \theta B \quad (I)$$

wherein θB represents a Brewster's angle represented by the formula (II):

$$\theta B = \arctan(n(\lambda)) \quad (II)$$

wherein $n(\lambda)$ represents a refractive index of the plate member with respect to infrared laser light having a wavelength λ.

The λ is a wavelength of the infrared laser light. The infrared laser light includes, for example, carbon dioxide laser light, and the like, but the present invention is not limited only to such examples. The wavelength λ of the infrared laser light is normally from 1000 to 12000 nm.

The critical angle θc is an angle calculated by the formula (III):

$$\theta c = \arcsin(1/n(\lambda)) \quad (III)$$

wherein $n(\lambda)$ is the same as above.

In the first embodiment, a diameter of each of the substrate bodies 11 and 12 can be appropriately set in accordance with an application of the optical component 1, a beam diameter of infrared laser light, or the like.

Further, a thickness of each of the substrate bodies 11 and 12 can be appropriately set in accordance with the diameter of each of the substrate bodies 11 and 12, a refractive index of the substrate with respect to a wavelength of infrared laser light to be used, or the like.

The antireflective film 15 is formed on the incident surface 11a of the substrate body 11. The antireflective film 16 is formed on the emitting surface 12a of the substrate body 12. The antireflective film 15 can prevent reflection of normal incident infrared laser light on the incident surface 11a of the substrate body 11. Therefore, it is possible to efficiently transmit the infrared laser light through the optical component 1, so as to suppress a loss of the infrared laser light.

The antireflective films 15 and 16 can, for example, be designed in accordance with the optical thin-film theory described in "Thin-film Optical Filters, 2nd Ed." written by H. A. MacLeod (issued in 1986), or the like.

A thickness of each of the antireflective films 15 and 16 can be appropriately decided in accordance with a wavelength of the infrared laser light to be used, or the like.

In the optical component 1 according to the first embodiment, the substrate elements 5a and 6a are arranged such that the gap G is provided between the inclined surface 11b of the substrate body 11 and the inclined surface 12b of the substrate body 12 via a spacer 8.

The spacer 8 is made of an annular sheet member of a thermal conductive material with favorable thermal conductivity, the annular sheet member including, for example, an annular sheet member made of metal such as aluminum or stainless, an annular sheet member made of non-metal having high flexibility, or the like. The spacer 8 is provided at the peripheral edges of the inclined surfaces 11b and 12b in order to keep the gap G. By providing the gap via the spacer 8 made of the thermal conductive material as thus described, heat generated in the optical component in association with transmission of infrared laser light can be dispersed to the outside via the spacer 8. This allows prompt cooling of the optical component. Therefore, the optical component 1 according to the first embodiment is expected to have a long life, since deterioration associated with generation of heat is suppressed.

In the present specification, the "thermal conductive material" refers to a material having a thermal conductivity of about 15 to 400 $W \cdot m^{-1} \cdot K^{-1}$. The thermal conductive material includes, for example, stainless steel, aluminum, and the like, but the present invention is not limited only to such examples.

A thickness of the spacer 8 (i.e., a size of the gap) can be appropriately set in accordance with a permissible range of a beam shift amount of infrared laser light of which polarization state is converted by the optical component 1 according to the first embodiment. Normally, the thickness of the spacer 8 (i.e., the size of the gap G) is preferably not larger than 150 μm and more preferably not larger than 100 μm from a viewpoint of suppressing shift of the laser beam associated with transmission through the optical component 1 as much as possible, and the thickness is preferably not larger than 50 μm from a viewpoint of facility in manufacturing of the spacer 8.

The holder 7 is a holding member which positions the substrate elements 5a and 6a in a width direction and a diameter direction and keeps them. An inner diameter of the holder 7 and a height of the inside thereof in the width direction can be appropriately set in accordance with diameters (maximum outer diameters) of the substrate elements 5a and 6a, heights of the substrate elements 5a and 6a in the width direction when they are opposed to each other, and the like. A material constituting the holder 7 includes, for example, an aluminum alloy, and the like, but the present invention is not limited only to such examples.

Figure 2:
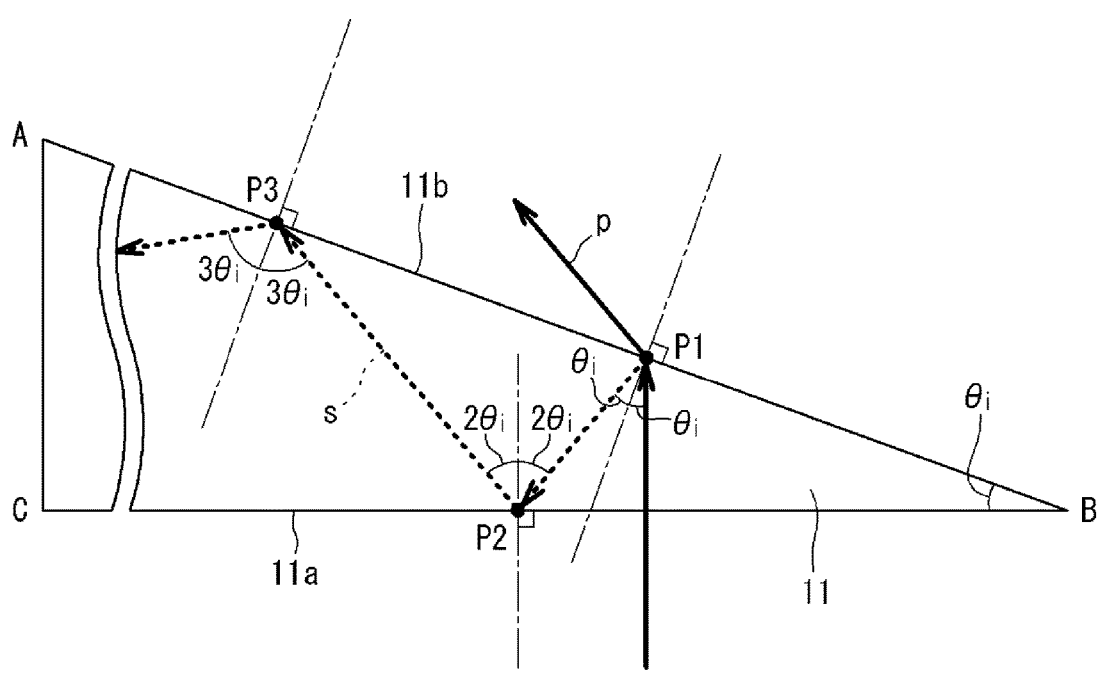
FIG. 2 is a schematic explanatory view showing optical paths of infrared laser light transmitted through a substrate body of the optical component according to the first embodiment of the present invention.

Next, a description will be given of a polarization theory of infrared laser light in the case where the optical component 1 according to the first embodiment is used. FIG. 2 is a schematic explanatory view showing optical paths of infrared laser light transmitted through the substrate body 11 of the optical component 1 according to the first embodiment of the present invention, FIG. 3 is a graph showing the relation among the refractive index, the Brewster's angle's complementary angle θtB, the critical angle θc and the Brewster's angle θB in the optical component according to the first embodiment of the present invention, FIG. 4A is a schematic explanatory view showing a polarization azimuth angle, and FIG. 4B is a schematic explanatory view showing optical paths of infrared laser light transmitted through the optical component 1 according to the first embodiment of the present invention.

In FIG. 2, symbol p denotes an optical path of a desired p-polarization component having a desired polarization plane, and symbol s denotes an optical path of a non-desired s-polarization component having a non-desired polarization plane. In FIG. 2, an angle of a corner formed by a plane A-B (inclined surface 11b) and a plane B-C (incident surface 11a) is the inclined angle θi of the inclined surface 11b.

Figure 4A:
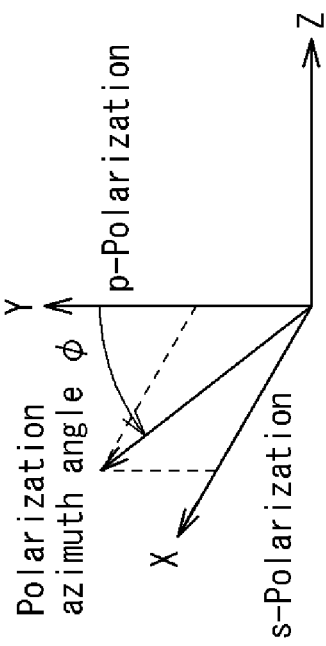
FIG. 4A is a schematic explanatory view showing a polarization azimuth angle.
Figure 4B:
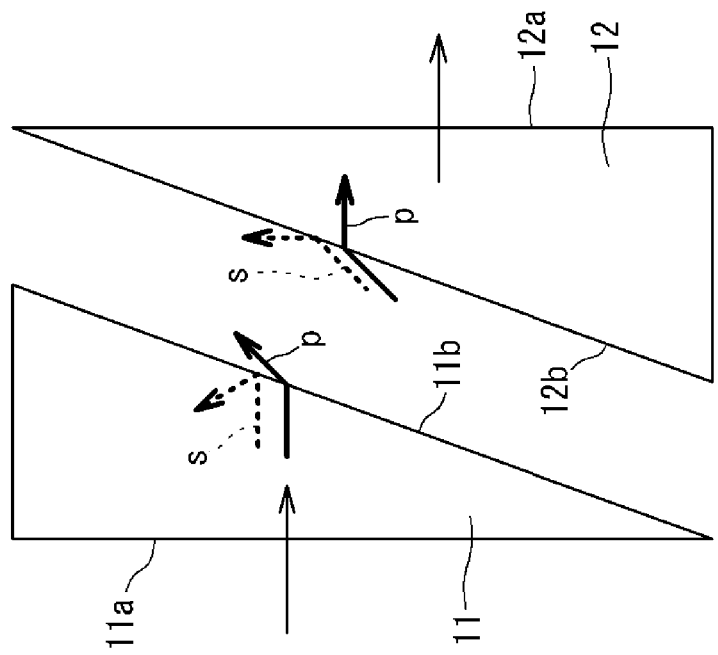
FIG. 4B is a schematic explanatory view showing optical paths of infrared laser light transmitted through the optical component according to the first embodiment of the present invention.

Further, in FIG. 4B, an x-axis shown in FIG. 4A extends in a vertical direction on the drawing and a y-axis and a z-axis are present on the drawing. In FIG. 4B, symbol p denotes an optical path of the desired p-polarization component having the desired polarization plane (projection component to a y-axis in FIG. 4A), and symbol s denotes the optical path of the non-desired s-polarization component having the non-desired polarization plane (projection component to an x-axis in FIG. 4A).

Figure 3:
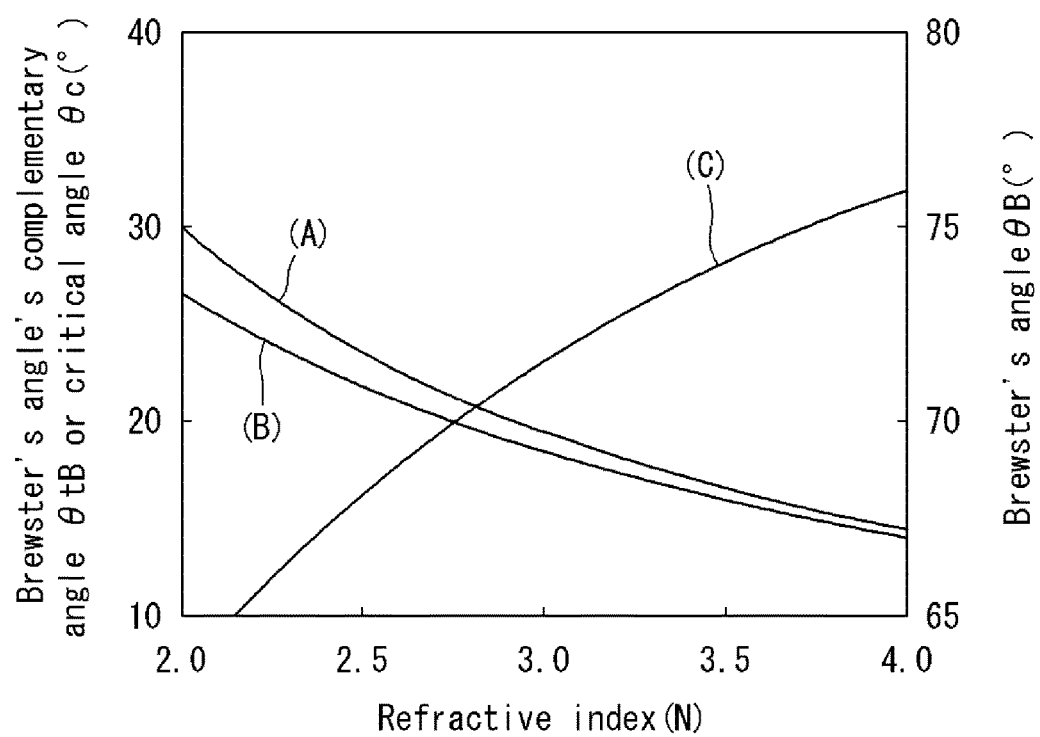
FIG. 3 is a graph showing the relation among a refractive index, a Brewster's angle's complementary angle θtB, a critical angle θc and a Brewster's angle θB in the optical component according to the first embodiment of the present invention.

Further, FIGS. 2 to 4 show, as an example, an optical component designed such that the desired p-polarization component is transmitted with a high transmittance and the non-desired s-polarization component is reflected with a high reflectance.

In the substrate body 11, infrared laser light normal incident from the incident surface 11a is transmitted inside the substrate body 11 without being reflected by the antireflective film (not shown), to reach a reaching point P1 on the plane A-B. Next, the desired p-polarization component is emitted to the outside of the substrate body 11.

In contrast, the non-desired s-polarization component is reflected toward the inside of the substrate body 11 at the reaching point P1, and reaches a reaching point P2 on the plane B-C. At this time, an incident angle of the non-desired s-polarization component at the reaching point P2 is 2×θi. Further, the non-desired s-polarization component is reflected toward the inside of the substrate body 11 at the reaching point P2, and reaches a reaching point P3 on the plane A-B. At this time, an incident angle of the non-desired s-polarization component at the point P3 is 3×θi. As thus described, the incident angle of the non-desired s-polarization component inside the substrate body 11 at the time of reflection gradually increases every time reflection occurs. For this reason, while the non-desired s-polarization component repeats reflection at reaching points after the point P2, the incident angle of the non-desired s-polarization component at the reaching point on the plane (for example, point P2, point P3, and the like) becomes larger than the critical angle θc which is defined by the refractive index n(λ) of the substrate body. Therefore, this leads to occurrence of total reflection of the desired s-polarization component. As a result, the non-desired s-polarization component reflected inside the substrate body 11 is absorbed and eliminated at the outer peripheral edge of the gap G.

The complementary angle θtB of the Brewster's angle θB (see line (B) of FIG. 3, left-axis scale), the critical angle θc (see line (A) of FIG. 3, left-axis scale) and the Brewster's angle θB (line (C) of FIG. 3, right-axis scale) depend on a refractive index of the material constituting the substrate body 11. By setting the inclined angle θi of the inclined surface 11b to not smaller than the complementary angle θtB of the Brewster's angle (line (B) of FIG. 3) and smaller than the critical angle θc (line (A) of FIG. 3), there can be realized partial reflection and partial transmission of the desired p-polarization component at the reaching point P1 and total reflection of the non-desired s-polarization component at reaching points excluding the reaching point P1 and subsequent thereto).

On the other hand, the desired p-polarization component which reaches the reaching point P1 becomes an emitting beam greatly polarized to the A-side of the plane A-B (inclined surface 11b). Therefore, as shown in FIG. 4, in the optical component 1, the substrate body 12 having the same size and the same shape of those of the substrate body 11 is arranged such that the inclined surface 11b of the substrate body 11 and the inclined surface 12b of the substrate body 12 are opposed to each other in parallel via the gap. Thus, according to the optical component 1 of the present embodiment, infrared laser light emitted from the substrate body 11 can be made incident on the inclined surface 12b of the opposing substrate body 12, and the beam can be proceeded without occurrence of large beam shift. When the non-desired s-polarization component is contained in the emitting beam, the non-desired s-polarization component is repeatedly reflected between the inclined surface 11b and the inclined surface 12b, and is absorbed and eliminated at the peripheral edges of the substrate bodies 11 and 12.

As thus described, in the optical component 1 according to the first embodiment, the inclined surfaces 11b and 12b of the substrate bodies 11 and 12 of the substrate elements 5a and 6a are opposed to each other via the gap G, and the incident surface 11a and the emitting surface 12a are parallel to each other. Thus, according to the optical component 1 of the first embodiment, infrared laser light having a desired polarization plane can be obtained by making infrared laser light normal incident to remove a non-desired polarization component.

Although a further specific example of the optical component according to the first embodiment of the present invention will then be shown, the present invention is not limited only to such an example, and its design can be appropriately changed in a range not inhibiting the object of the present invention.

Table 1 shows polarizer characteristics of the optical component 1 in which a substrate body made of zinc selenide (refractive index: 2.403) or made of germanium (refractive index: 4.0028) is used. The polarizer characteristics shown in Table 1 are polarizer characteristics in a case where the polarization azimuth angle is set to 45° and the inclined angle of the inclined surface is set to the complementary angle θtB of the Brewster's angle θB in the substrate body made of zinc selenide and the substrate body made of germanium. The polarization azimuth angle is an angle obtained by measuring a polarization direction of incident linearly polarized light from a p-polarization axis corresponding to the inclined surface of the substrate body.

TABLE 1

| | Material of substrate body | |
|---|---|---|
| | Zinc selenide | Germanium |
| Refractive index n(λ) of substrate body (λ = 10.6 μm) | 2.403 | 4.0028 |
| Brewster's angle θB (°) | 67.4 | 76.0 |
| Critical angle θc (°) | 24.6 | 14.0 |
| Inclined angle θi of substrate body (°) | 22.6 | 14.0 |
| Outer diameter D of substrate body (mm) | 40 | |

TABLE 1-continued

| | Material of substrate body | | | | | |
|---|---|---|---|---|---|---|
| | Zinc selenide | | | Germanium | | |
| Required length of thick edge section of substrate body (mm) | 16.6 | | | 10.0 | | |
| Width dG of gap G (μm) | 50 | 100 | 150 | 50 | 100 | 150 |
| Beam shift amount (μm) | 92 | 183 | 275 | 182 | 364 | 546 |
| p-polarization transmittance Tp (%) | 100 | | | 100 | | |
| s-polarization transmittance Ts (%) | 25.2 | | | 4.9 | | |
| Polarization degree [(Tp − Ts)/(Tp + Ts)] | 59.7 | | | 90.7 | | |
| Extinction ratio with polarization azimuth angle ϕ = 45° [Tp/(2Ts)] | 2.0 | | | 10.2 | | |

Figure 5:
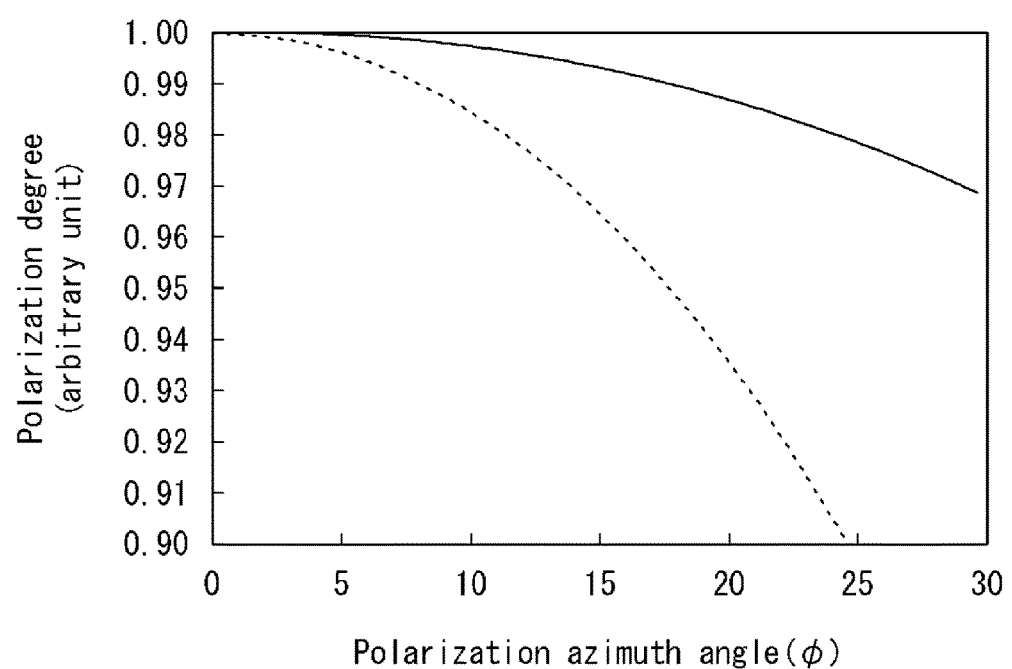
FIG. 5 is a graph showing the relation between a polarization azimuth angle and a polarization degree in an optical component using a substrate body having polarizer characteristics shown in Table 1.

Further, FIG. 5 shows the relation between the polarization azimuth angle and a polarization degree in an optical component in which a substrate body with the polarizer characteristics shown in Table 1 is used. In the figure, a solid line indicates an optical component having the substrate body made of germanium, and a broken line indicates an optical component having the substrate body made of zinc selenide.

As shown in Table 1, it can be seen that the smaller the width of the gap G is made, the more the beam shift amount can be reduced. In addition, the above required characteristics can be achieved, as long as a polarization azimuth angle of a polarization beam linearly incident on the optical component is very small when required characteristics in the optical component are a polarization degree of not lower than 0.97 and an extinction ratio of not lower than 33. For example, as shown in FIG. 5, in the optical component having the substrate body made of zinc selenide, the required characteristics can be achieved when the polarization azimuth angle is not larger than 13.5°. Further, in the optical component having the substrate body made of germanium, the required characteristics can be achieved when the polarization azimuth angle is not larger than 29°. Therefore, the optical component according to the first embodiment functions as a polarizer in the case of incident linear polarized light with a minute polarization azimuth angle in the above range. That is, the optical component according to the first embodiment is effective when slight shift of the polarization plane is to be adjusted.

Figure 6:
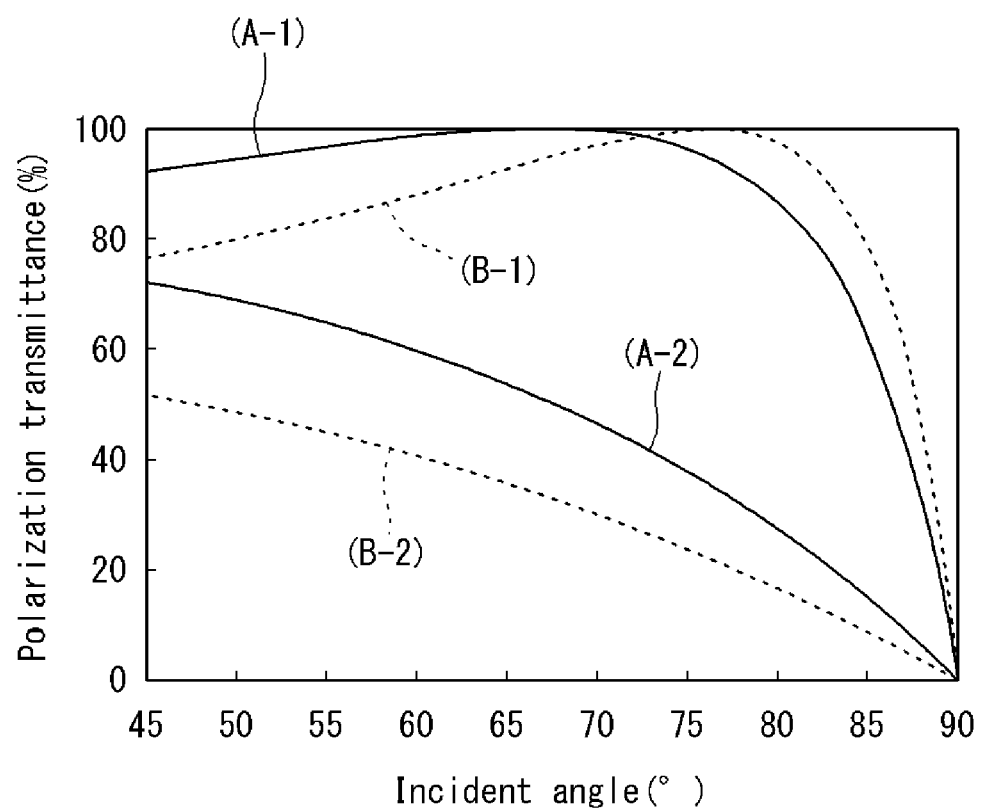
FIG. 6 is a graph showing the relation between an incident angle and a polarization transmittance of infrared laser light in the substrate body of the optical component according to the first embodiment of the present invention.

Furthermore, FIG. 6 is a graph showing the relation between an incident angle and a polarization transmittance of infrared laser light in the substrate body of the optical component according to the first embodiment of the present invention. FIG. 6 shows dependency of the polarization transmittance on the incident angle in the case of using the optical component 1 in which zinc selenide (refractive index: 2.403) or germanium (refractive index: 4.0028) is used as the material constituting the substrate bodies 11 and 12. In the figure, (A-1) is a polarization transmittance of the desired p-polarization component in the optical component 1 in which zinc selenide is used as the material constituting the substrate bodies 11 and 12, (A-2) is a polarization transmittance of the non-desired s-polarization component in the optical component 1 in which zinc selenide is used as the material constituting the substrate bodies 11 and 12, (B-1) is a polarization transmittance of the desired p-polarization component in the optical component 1 in which germanium is used as the material constituting the substrate bodies 11 and 12, and (B-2) is a polarization transmittance of the non-desired s-polarization component in the optical component 1 in which germanium is used as the material constituting the substrate bodies 11 and 12.

As shown in (A-1) of FIG. 6, it can be seen that in the optical component 1 in which zinc selenide is used as the material constituting the substrate bodies 11 and 12, a Brewster's angle at which the polarization transmittance of the desired p-polarization component becomes 100% is 67.4°. In this case, the polarization transmittance of the non-desired s-polarization component is 50%. On the other hand, as shown in (B-1) of FIG. 6, it can be seen that in the optical component 1 in which germanium is used as the material constituting the substrate bodies 11 and 12, a Brewster's angle at which the polarization transmittance becomes 100% is 76.0°. In this case, the polarization transmittance of the non-desired s-polarization component is 22%. As thus described, in the optical component 1 according to the first embodiment, the substrate bodies 11 and 12 are arranged such that the inclined surface 11b of the substrate body 11 and the inclined surface 12b of the second substrate body 12 are opposed to each other via the gap, and that the incident surface 11a and the emitting surface 12a are parallel to each other. Furthermore, in the optical component 1 according to the first embodiment, the inclined angle θi of each of the inclined surfaces 11b and 12b of the substrate bodies 11 and 12 is not smaller than the complementary angle θtB of the Brewster's angle θB of the infrared laser light incident on each of the substrate bodies 11 and 12 and smaller than the critical angle θc. Therefore, according to the optical component 1 of the first embodiment, it can be seen that desired polarizer characteristics are obtained when the polarization azimuth angle in the above range is adopted.

In the optical component 1 according to the first embodiment, as the antireflective films 15 and 16, an antireflective film made up of a multilayer film having a multilayer structure can be used as in optical components 2 and 3 according to a second embodiment described later.

In this case, as the materials constituting the antireflective films 15 and 16, a high refractive-index film material and a low refractive-index film material can be appropriately used in combination. The high refractive-index film material includes, for example, zinc selenide, germanium, zinc sulfide, zinc telluride, lead telluride, and the like, but the present invention is not limited only to such examples. These high refractive-index film materials can be used alone or used in admixture of two or more kinds thereof. In addition, the low refractive-index film material includes, for example, fluorides such as thorium fluoride, barium fluoride, yttrium fluoride, ytterbium fluoride, aluminum fluoride, samarium fluoride, praseodymium fluoride, alkaline earth metal fluoride and rare earth metal fluoride; a solid solution including two or kinds of fluorides selected from the above; and the like, but the present invention is not limited only to such examples. These low refractive-index film materials can be used alone or used in admixture of two or more kinds thereof.

[Optical Component According to Second Embodiment]

Figure 7:
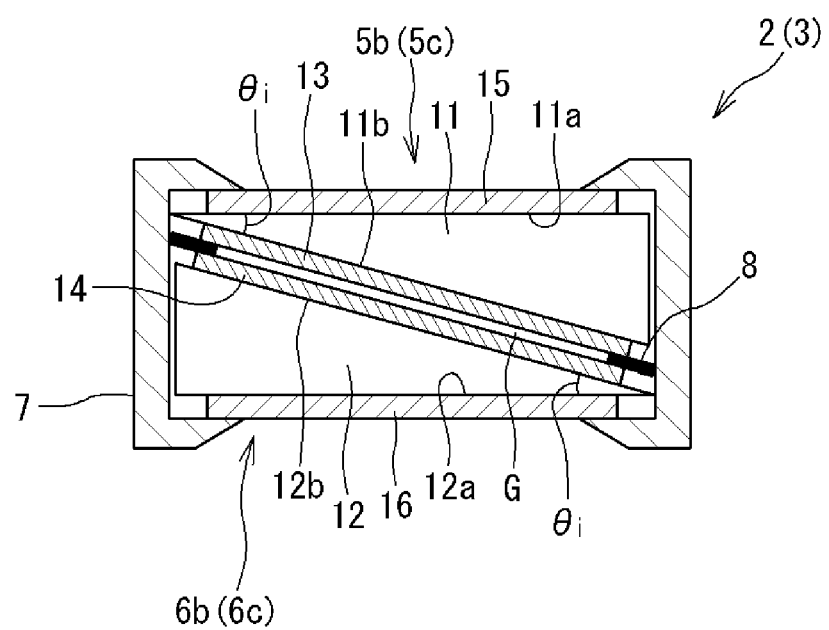
FIG. 7 is a sectional explanatory view showing an optical component according to a second embodiment of the present invention.
Figure 8:
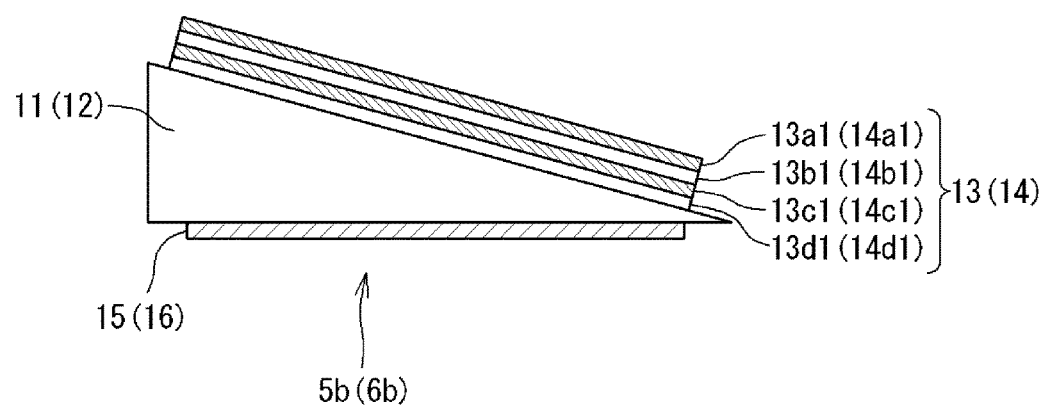
FIG. 8 is a partially enlarged explanatory view showing one example of a substrate element of the optical component according to the second embodiment of the present invention.
Figure 9:
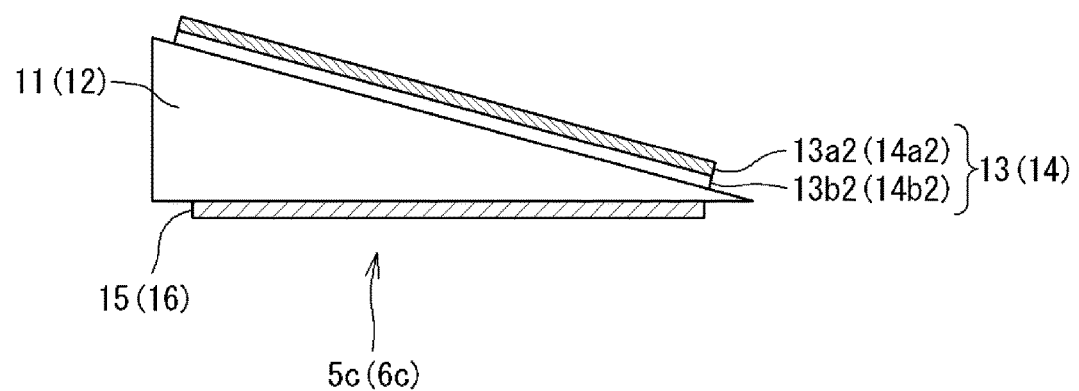
FIG. 9 is a partially enlarged explanatory view showing one example of the substrate element of the optical component according to the second embodiment of the present invention.

FIG. 7 is a sectional explanatory view showing the optical components 2 and 3 according to a second embodiment of the present invention, FIG. 8 is a partially enlarged explanatory view showing one example of a substrate element of the optical component 2 according to the second embodiment of the present invention, and FIG. 9 is a partially enlarged explanatory view showing one example of the substrate element of the optical component 3 according to the second embodiment of the present invention.

As shown in FIGS. 8 and 9, the optical components 2 and 3 shown in FIG. 7 has a different structure of each of the polarization control films 13 and 14, wherein the polarization control films 13 and 14 are formed on the inclined surface 11b of the substrate body 11 and the inclined surface 12b of the substrate body 12 respectively, and wherein the substrate bodies 11 and 12 constitute the substrate elements 5b, 5c, 6b, and 6c.

In addition, the optical components 2 and 3 according to the second embodiment shown in FIG. 7 are different from the optical component 1 according to the first embodiment in that each of the optical components 2 and 3 has the polarization control films 13 and 14, wherein the polarization control films 13 and 14 are formed on the inclined surface 11b of the substrate body 11 and the inclined surface 12b of the substrate body 12 respectively, and wherein the substrate bodies 11 and 12 constitute the substrate elements 5b, 5c, 6b, and 6c.

In the optical components 2 and 3 according to the second embodiment, the polarization control films 13 and 14 are formed on the inclined surfaces 11b and 12b respectively. Therefore, in the optical components 2 and 3, by means of the polarization control films 13 and 14, it is possible to improve a reflectance with respect to non-desired light on each of the inclined surfaces 11b and 12b, and to make a transmittance of desired light as high as possible. Thus, the optical components 2 and 3 according to the second embodiment can confine non-desired light in the substrate bodies 11 and 12 or in the gap G between the substrate bodies 11 and 12, to thereby absorb and eliminate the non-desired light at the peripheral edges of the substrate bodies 11 and 12 or at the peripheral edge of the gap G. For this reason, each of the optical components 2 and 3 according to the second embodiment has higher polarizer characteristics than the polarizer characteristics of the optical component according to the first embodiment. Therefore, according to the optical components 2 and 3 of the second embodiment, the polarization component in the non-desired direction can be reflected inside the substrate body 11 or in the gap G between the substrate body 11 and the substrate body 12 combined with the substrate body 11, so as to more effectively suppress emission of the non-desired polarization component to the outsides of the optical components 2 and 3.

In the optical components 2 and 3 according to the second embodiment shown in FIG. 7, the substrate bodies 11 and 12, the antireflective film 15 formed on the incident surface 11a of the substrate body 11, the antireflective film 16 formed on the emitting surface 12a of the substrate body 12, the holder 7, the spacer 8, and the inclined angle θi of each of the inclined surfaces 11b and 12b are the same as the substrate bodies 11 and 12, the antireflective films 15 and 16, the holder 7, the spacer 8, and the inclined angle θi of each of the inclined surfaces 11b and 12b in the optical component 1 according to the first embodiment, respectively.

As shown in Table 2, the polarization control films 13 and 14 of the optical component 2 shown in FIG. 8 have a first layer made of zinc selenide, a second layer made of thorium fluoride, a third layer made of zinc selenide, and a fourth layer made of thorium fluoride sequentially from the side of atmospheric medium (outermost surface of the substrate element 5b or 6b), the first layer including a first layer 13a1 and a first layer 14a1, the second layer including a second layer 13b1 and a second layer 14b1, the third layer including a third layer 13c1 and a third layer 14c1, and the fourth layer including a fourth layer 13d1 and a fourth layer 14d1. A refractive index of zinc selenide described above with respect to infrared laser light having a wavelength of 10600 nm is 2.403. In addition, a refractive index of thorium fluoride described above with respect to the infrared laser light having a wavelength of 10600 nm is 1.35. In the optical component 2, the first layers 13a1 and 14a1 made of zinc selenide and the third layers 13c1 and 14c1 made of zinc selenide are high refractive-index layers made of the high refractive-index film material. In addition, in the optical component 2, the second layers 13b1 and 14b1 made of thorium fluoride and the fourth layers 13d1 and 14d1 made of thorium fluoride are low refractive-index layers made of the low refractive-index film material.

Moreover, as shown in Table 3, the polarization control films 13 and 14 of the optical component 3 shown in FIG. 9 have a first layers made of zinc selenide and a second layer made of thorium fluoride sequentially from the sides of atmospheric mediums (outermost surface of the substrate element 5c or 6c), the first layer including a first layer 13a2 and a first layer 14a2 and the second layer including a second layer 13b2 and a second layer 14b2. In the optical component 3, the first layers 13a2 and 14a2 made of zinc selenide are high refractive-index layers made of the high refractive-index film material. In addition, in the optical component 3, the second layers 13b2 and 14b2 made of thorium fluoride are low refractive-index layers made of the low refractive-index film material.

As thus described, by using as the polarization control films 13 and 14 the multilayer films each having the multilayer structure in which the high refractive-index layer and the low refractive-index layer are alternately laminated, polarization can be controlled in a thin polarization control film. Thus, according to the optical component 3 of the present embodiment, there can be obtained infrared laser light having a polarization plane in a desired direction in a smaller space. In addition, by forming the polarization control films 13 and 14 on the inclined surfaces 11b and 12b respectively, it is possible to make the optical component compact, so as to downsize the optical component for controlling polarization which is required for the laser processing machine and the like. Moreover, in the case where such multilayer films are used as the polarization control films 13 and 14, polarization control films suitable for obtaining desired infrared laser light can be designed by appropriately selecting respective kinds of the high refractive-index film material and the low refractive-index film material and respective thicknesses of the high refractive-index layer and the low refractive-index layer. The polarization control films 13 and 14 can be designed by performing optimization calculation with target polarization characteristics (polarization component transmittance and phase difference between polarization components) taken as targets with the use of commercially available optical thin film software and known necessary conditions such as the refractive index of the substrate material, the refractive index (dispersion) of the film material to be used, the incident angle and the like, and performing calculation for film design.

As described above, each of the polarization control films 13 and 14 is preferably a multilayer film having a multilayer structure in which at least two kinds of layers with different refractive indexes are alternately laminated.

The high refractive-index film material includes, for example, germanium, zinc sulfide, zinc telluride, lead telluride, and the like, in addition to zinc selenide described above, but the present invention is not limited only to such examples. Furthermore, in addition to thorium fluoride described above, the low refractive-index film material includes, for example, fluorides such as barium fluoride, yttrium fluoride, ytterbium fluoride, aluminum fluoride, samarium fluoride and praseodymium fluoride; a solid solution generated by mixing alkaline earth metal fluoride, rare earth metal fluoride and the like at a suitable mass ratio and melting the mixture, and the like, but the present invention is not limited only to such examples.

In the optical component 2, each of the antireflective films 15 and 16 includes a first layer (thickness 232 nm) made of zinc selenide being the high refractive-index film material and a second layer (thickness 1034 nm) made of thorium fluoride being the low refractive-index film material sequentially from the outside of each of the substrate body 11 or 12.

Further, in the optical component 3, each of the antireflective films 15 and 16 includes a first layer (thickness 500 nm) made of zinc selenide being the high refractive-index film material and a second layer (thickness 601 nm) made of thorium fluoride being the low refractive-index film material sequentially from the outside of each of the substrate bodies 11 and 12.

The antireflective film 15 as thus described allows to prevent normal incident infrared laser light from reflection on the incident surface 11a of the substrate body 11. In this case, since the infrared laser light can be efficiently transmitted through the optical component 3, a loss of the infrared laser light can be suppressed.

In the present invention, as for the material constituting the antireflective films 15 and 16, instead of using zinc selenide and thorium fluoride described above, it is possible to appropriately select the material out of the high refractive-index film material and the low refractive-index film material in accordance with a wavelength of the infrared laser light to be used, and use the selected material. In addition, the antireflective films 15 and 16 as thus described can, for example, be designed in accordance with the optical thin-film theory described in "Thin-film Optical Filters, Second Edition" written by H. A. MacLeod (issued in 1986), or the like.

In the present invention, each of the antireflective films 15 and 16 is a multilayer film including the high refractive-index layer made of the high refractive-index film material and the low refractive-index layer made of the low refractive-index film material.

The film material of each of the antireflective films 15 and 16, the number of each of high refractive-index layers and low refractive-index layers, and thickness of each of the high refractive-index layer and the low refractive-index layer can be appropriately determined in accordance with a wavelength of the infrared laser light to be used, or the like.

When the polarization control films are not provided on the inclined surfaces 11b and 12b as in the optical component 1 according to the first embodiment described above, as shown in Table 1 and FIG. 5, with a large polarization azimuth angle of 45°, the polarization degree and the extinction ratio in the optical component 1 do not satisfy a target value (not lower than 0.97) of the polarization degree and a target value (not lower than 33) of the extinction ratio which are required as the polarizer optical characteristics. Therefore, the polarizer optical characteristic can be desirably improved depending on an application of the optical component. From the target polarization degree and extinction ratio required as the polarizer characteristics of the optical component, the polarization control film is required to have a p-polarization transmittance (Tp)>99% and an s-polarization transmittance (Ts)<13%. Furthermore, a transmittance phase shift on transmission Δt in the polarization control film can be desired to be not larger than 1° (not larger than 2° as the optical component).

Therefore, in the optical components 2 and 3 according to the second embodiment, the polarization control films 13 and 14 each satisfying the foregoing required polarization component transmittance and transmission phase shift on transmission are provided on the inclined surface 11b of the substrate body 11 and the inclined surface 12b of the substrate body 12 respectively.

Figure 10:
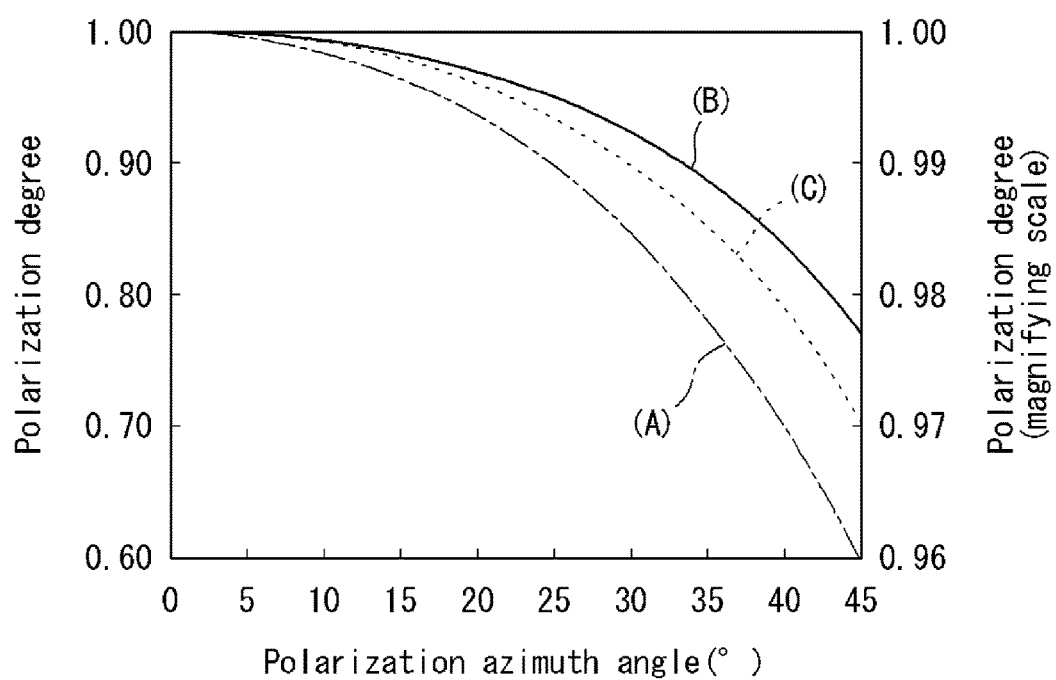
FIG. 10 is a graph showing a result of investigating the relation between the polarization azimuth angle and the polarization degree in each of the optical components according to the first embodiment and the second embodiment of the present invention.

Hereinafter, Tables 2 and 3 show results of examining the polarizer characteristics of the optical components 2 and 3 according to the second embodiment. Further, FIG. 10 shows a result of examining the relation between the polarization azimuth angle and the polarization degree in the optical component according to each of the first embodiment and the second embodiment of the present invention. In the figure, (A) shows the relation between the polarization azimuth angle and the polarization degree (polarization degree on a left axis scale) in the optical component 1 according to the first embodiment, (B) shows the relation between the polarization azimuth angle and the polarization degree (see polarization degree on a right axis scale (magnifying scale)) in the optical component 2 according to the second embodiment, and (C) shows the relation between the target polarization azimuth angle and polarization degree in a standard optical component.

TABLE 2

| | | Constituent material | Optical thickness (unit: λ/4) | Layer thickness (nm) |
|---|---|---|---|---|
| | Atmospheric medium | | — | — |
| Polarization control film 13(14) | First layer 13a1(14a1) | Zinc selenide | 1.1388 | 1256 |
| | Second layer 13b1(14b1) | Thorium fluoride | 0.6202 | 1217 |
| | Third layer 13c1(14c1) | Zinc selenide | 0.1269 | 140 |
| | Fourth layer 13d1(14d1) | Thorium fluoride | 0.6097 | 1197 |
| Substrate body 5b(6b) | | Zinc selenide | — | — |
| Reflection angle in gap G portion (°) | | | 76 | |

| Polarization characteristics | Polarization control film | Optical component |
|---|---|---|
| Transmittance of p-polarization component (%) | 99.91 | 99.82 |
| Transmittance of s-polarization component (%) | 10.78 | 1.16 |

TABLE 2-continued

| | | |
|---|---|---|
| Transmittance phase delay (°) | 0.104 | 0.21 |
| Polarization degree | 0.9770 | |
| Extinction ratio in the case of polarization azimuth angle φ = 45° | 42.98 | |

TABLE 3

| | | | | Optical thickness (unit: λ/4) | Layer thickness (nm) |
|---|---|---|---|---|---|
| | Atmospheric medium | | | — | — |
| Polarization control film 13(14) | First layer 13a2(14a2) | Zinc selenide | | 1.6970 | 1871 |
| | Second layer 13b2(14b2) | Thorium fluoride | | 0.4666 | 916 |
| | Substrate body 5c(6c) | Germanium | | — | — |
| | Reflection angle in gap G portion (°) | | | 78 | |

| Polarization characteristics | Polarization control film | Optical component |
|---|---|---|
| Transmittance of p-polarization component (%) | 99.91 | 99.82 |
| Transmittance of s-polarization component (%) | 9.99 | 0.10 |
| Transmittance phase delay (°) | 0.56 | 1.12 |
| Polarization degree | 0.9998 | |
| Extinction ratio in the case of polarization azimuth angle φ = 45° | 499.2 | |

As shown in Tables 2 and 3, it can be seen that the polarization degree and the extinction ratio in each of the optical components 2 and 3 according to the second embodiment are improved as compared to the polarization degree and the extinction ratio in the case of the polarization azimuth angle of 45° in the optical component 1 according to the first embodiment shown in FIG. 5. Therefore, it can be seen that by providing the polarization control films 13 and 14 on the inclined surface 11b of the substrate body 11 and the inclined surface 12b of the substrate body 12 respectively, there can be obtained an optical component which satisfies the foregoing required polarizer characteristics.

Further, as shown in FIG. 10, it can be seen that the optical component 2 according to the second embodiment has the polarizer characteristics exceeding target specifications at any polarization azimuth angle including the polarization azimuth angle of 45° which shows performance of the polarizer. Moreover, in the optical component 1 according to the first embodiment, it can be seen that in the optical component having the substrate body made of zinc selenide, a polarization beam is well controlled, and the polarizer characteristics are practically sufficient when the polarization azimuth angle is not larger than 13.5°. Moreover, in the optical component 1 according to the first embodiment, it can be seen that in the optical component having the substrate body made of germanium, a polarization beam is well controlled, and the polarizer characteristics are practically sufficient when the polarization azimuth angle is not larger than 29°.

[Optical Component According to Third Embodiment]

Figure 11:
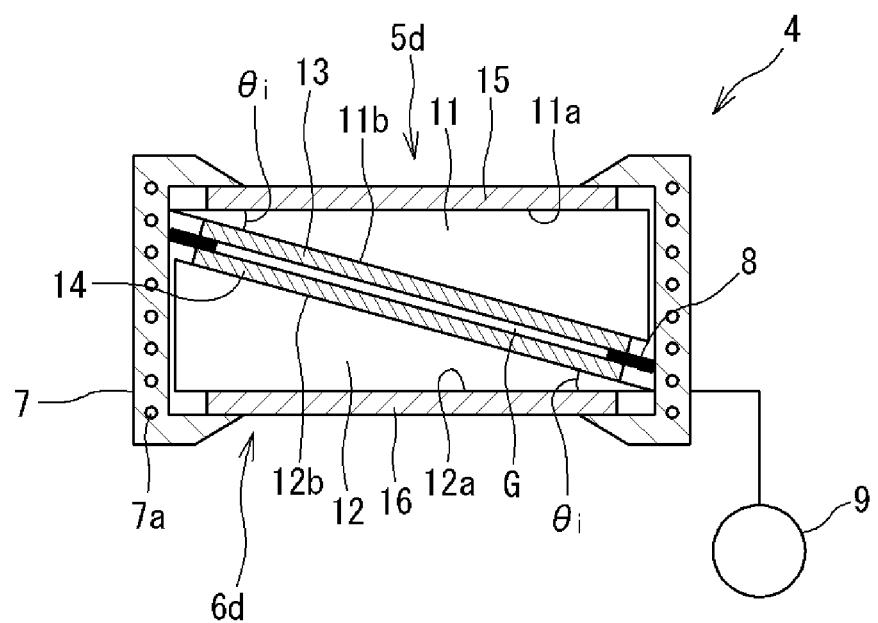
FIG. 11 is a sectional explanatory view showing an optical component according to a third embodiment of the present invention.

FIG. 11 is a sectional explanatory view showing an optical component 4 according to a third embodiment of the present invention.

The optical component 4 according to the third embodiment is different from the optical component 1 according to the first embodiment in that the holder 7 has a cooling unit 7a for efficiently cooling the substrate body 11 of the substrate element 5d and the substrate body 12 of the substrate element 6d, and a pump 9 for circulating a cooling medium in the cooling unit 7a.

In the optical component 4 according to the third embodiment, the substrate bodies 11 and 12, the antireflective film 15 formed on the incident surface 11a of the substrate body 11, the antireflective film 16 formed on the emitting surface 12a of the substrate body 12, the polarization control film 13 formed on the inclined surface 11b of the substrate body 11, the polarization control film 14 formed on the inclined surface 12b of the substrate body 12, the spacer 8, and the inclined angle θi of each of the inclined surfaces 11b and 12b are the same as the substrate bodies 11 and 12, the polarization control films 13 and 14, the antireflective films 15 and 16, the holder 7, the spacer 8, and the inclined angle θi of each of the inclined surfaces 11b and 12b in the optical components 2 and 3 according to the second embodiment, respectively.

In the third embodiment, the cooling unit 7a is a flow path for circulating the cooling medium. The cooling medium includes, for example, water, and the like, but the present invention is not limited only to such examples.

In the optical component 4 according to the third embodiment which has the cooling unit 7a, there can be promptly cooled the optical component which generates heat in association with transmission of the infrared laser light having the polarization component in the desired direction and in association with reflection and absorption of the infrared laser light having the polarization component in the non-desired direction in the optical component. Therefore, the optical component 4 according to the third embodiment is expected to have a long life since deterioration in optical characteristics due to heat is suppressed in a use state accompanied with higher heat generation.

[Manufacturing Method for Optical Component]

Next, one example of the manufacturing method for the optical component of the present invention will be described in detail with reference to the attached drawing. Hereinafter, a description will be given by taking as an example a manufacturing method for the optical component 2 according to the second embodiment which has the polarization control film. FIG. 12 is a process chart showing a procedure of the manufacturing method for the optical component according to the second embodiment of the present invention. In FIG. 12, in order to facilitate description of the polarization control film, the antireflective film and the spacer which constitute the optical component, they are drawn with sizes thereof appropriately exaggerated.

First, each of the substrate body 11 having the inclined surface 11b inclined at the inclined angle θi and the substrate body 12 having the inclined surface 12b inclined at the inclined angle θi described above is obtained from a disk-shaped member W made of a material through which infrared laser light transmits and of which refractive index with respect to the infrared laser light is not lower than 2 (see FIG. 12(a)). The substrate bodies 11 and 12 as thus described can be formed in such a manner that, after an intermediate material corresponding to each of the substrate bodies 11 and 12 has been cut out of a material used for the optical component, generally, grinding processing, cutting processing, polishing processing and the like are performed on the intermediate material. Although the refractive index of the material with respect to the infrared laser light can be not lower than 2, it is preferably not higher than 5.

Next, the polarization control films 13 and 14 are formed on the inclined surface 11b of the substrate body 11 and the inclined surface 12b of the substrate body 12 respectively (see FIG. 12(b)). The formation of each of polarization control films 13 and 14 can be performed, for example, by laminating a layer constituting the polarization control film 13 and a layer constituting the polarization control film 14 on the surface of the inclined surface 11b and the surface of the inclined surface 12b respectively. The lamination of each layer constituting the polarization control films 13 and 14 on the surfaces of the inclined surfaces 11b and 12b can be performed by, for example, a resistance heating deposition method, an electron beam evaporation method, a sputtering method, an ion beam evaporation method, or the like, but the present invention is not limited only to such techniques.

Next, the antireflective films 15 and 16 are formed on the incident surface 11a of the substrate body 11 and the emitting surface 12a of the substrate body 12 respectively, to obtain the substrate elements 5b and 6b (see FIG. 12(c)). The formation of antireflective films 15 and 16 can be formed, for example, by laminating a layer constituting the antireflective film 15 and a layer constituting the polarization control film 16 on the surfaces of the incident surface 11a and the emitting surface 12a respectively. The lamination of each layer constituting the antireflective films 15 and 16 on the surfaces of the incident surface 11a and the emitting surface 12a can be performed by, for example, the resistance heating deposition method, the electron beam evaporation method, the sputtering method, the ion beam evaporation method, or the like, but the present invention is not limited only to such techniques.

Thereafter, the polarization control film 13 of the substrate element 5b and the polarization control film 14 of the substrate element 6b are made opposed to each other via the spacer 8 to provide the gap G, and then these substrate elements 5b and 6b are kept by the holder 7, to obtain the optical component 1 (see FIG. 12(d)).

The embodiments disclosed herein should be considered as illustrative and not restrictive. The scope of the present invention is defined by the claims, and is intended to include meanings equivalent to the claims and all modifications within the scope.

Apart from the claims, according to the present invention described above, the following configuration can also be obtained.

(Appendix 1)

An optical component having a gap with a size of 50 to 150 μm.

In this case, it can be expected that shift between an incident beam on the optical component and an emitting beam therefrom, which occurs due to the gap G formed in the two opposed substrate bodies, can be held low.

REFERENCE SIGNS LIST

1: Optical component
2, 3: Optical component
4: Optical component
5a, 5b, 5c, 5d, 6a, 6b, 6c, 6d: Substrate element
7: Holder
7a: Cooling unit
8: Spacer
9: Pump
11, 12: Substrate body
11a: Incident surface (target surface on which beam is incident)
11b, 12b: Inclined surface
11, 12: Substrate body
12a: Emitting surface
13, 14: Polarization control film
13a1, 14a1: First layer
13b1, 14b1: Second layer
13c1, 14c1: Third layer
13d1, 14d1: Fourth layer
13a2, 14a2: First layer
13b2, 14b2: Second layer
15, 16: Antireflection film

The invention claimed is:

1. An optical component which causes infrared laser light to transmit therethrough, to give infrared laser light having a polarization plane in a desired direction,
the optical component comprising:
a first substrate body which is made of a plate member through which the infrared laser light transmits, the plate member having a refractive index of not lower than 2 with respect to the infrared laser light and an optical isotropy, the first substrate body having an incident surface on which the infrared laser light is incident, and an inclined surface inclined with respect to the incident surface at a predetermined inclined angle θi;
a second substrate body which is made of the plate member, and has an emitting surface which emits the infrared laser light, and an inclined surface inclined with respect to the emitting surface at the predetermined inclined angle θi; and
an antireflective film which is formed on each of the incident surface and the emitting surface and prevents reflection of normal incident infrared laser light,
wherein
the inclined angle θi is not smaller than a complementary angle θtB of a Brewster's angle θB of infrared laser light incident on the plate member and smaller than a critical angle θc,
the complementary angle θtB of the Brewster's angle θB is an angle calculated by the formula (I):

$$\theta tB = 90° - \theta B \quad (I)$$

wherein θB represents a Brewster's angle represented by the formula (II):

$$\theta B = \arctan(n(\lambda)) \quad (II)$$

wherein $n(\lambda)$ represents a refractive index of the plate member with respect to infrared laser light with a wavelength $\lambda$, the critical angle θc is an angle calculated by the formula (III):

$$\theta c = \arcsin(1/n(\lambda)) \quad (III)$$

wherein $n(\lambda)$ is the same as above, and the first and second substrate bodies are arranged such that the inclined surface of the first substrate body and the inclined surface of the second substrate body are opposed to each other via a gap, and that the incident surface and the emitting surface are parallel to each other.

2. The optical component according to claim 1, further comprising a polarization control film for transmitting a desired polarization component of the infrared laser light therethrough and suppressing incidence of an unnecessary polarization component of the infrared laser light, the polarization control film being formed on the inclined surface of each of the first substrate body and the second substrate body.

3. The optical component according to claim 2, wherein the polarization control film is a multilayer film having a multilayer structure in which two or more kinds of layers each having different refractive indexes to each other are alternately laminated.

4. The optical component according to claim 2, wherein the polarization control film is a multilayer film having a multilayer structure in which a first refractive index layer and a second refractive index layer are alternately laminated, the first refractive index layer having a first refractive index and a second refractive index layer having a second refractive index which is lower than the first refractive index.

5. The optical component according to claim 1, further comprising a holder for keeping the first substrate body and the second substrate body such that the inclined surface of the first substrate body and the inclined surface of the second substrate body are opposed to each other via a gap, and that the incident surface and the emitting surface are parallel to each other, wherein the holder has a cooling unit for cooling the first and second substrate bodies.

6. The optical component according to claim 1, wherein a spacer made of a thermal conductive material for keeping the gap is provided at a peripheral edge of the inclined surface of each of the first and second substrate bodies.

* * * * *